United States Patent [19]

Carda

[11] 4,230,962
[45] Oct. 28, 1980

[54] BRUSH PLATE ASSEMBLY

[76] Inventor: Edward E. Carda, 5540 Robbins Ave., Portage, Ind. 46368

[21] Appl. No.: 932,809

[22] Filed: Aug. 11, 1978

[51] Int. Cl.³ .................................. H02K 13/00
[52] U.S. Cl. ............................................. 310/239
[58] Field of Search ............. 310/239, 241, 242, 238, 310/237, 231, 245, 247, 244, 46

[56] References Cited

U.S. PATENT DOCUMENTS

| 930,864 | 8/1909 | Kearney | 310/239 |
|---|---|---|---|
| 1,934,784 | 11/1933 | Bauroth | 310/239 |
| 2,679,606 | 5/1954 | Baudry | 310/239 X |
| 2,692,342 | 10/1954 | Wahlberg | 310/239 |
| 2,747,117 | 5/1956 | Litz | 310/239 |
| 2,897,386 | 7/1959 | Jones | 310/239 |
| 3,026,433 | 3/1962 | Mueller | 310/239 |
| 4,114,061 | 9/1978 | Hayes | 310/241 |

FOREIGN PATENT DOCUMENTS 1306178  9/1942  France .................................. 310/238

Primary Examiner—R. Skudy
Attorney, Agent, or Firm—Sabin C. Bronson

[57] ABSTRACT

Starting motors operated on direct current have a brush armature combination to provide necessary rotation. Brush plate assemblies conventionally include a brush plate with a plurality of brush holders attached thereto and an elongated stud as an integral part of the plate, to convey D.C. power to the plate. During maintenance, the elongated stud may be damaged. Replacement studs may be removably secured to the brush plate, thereby salvaging the original assembly, except for the damaged stud. In addition, new brush plate assemblies can be made with removeable elongated stud members.

3 Claims, 6 Drawing Figures

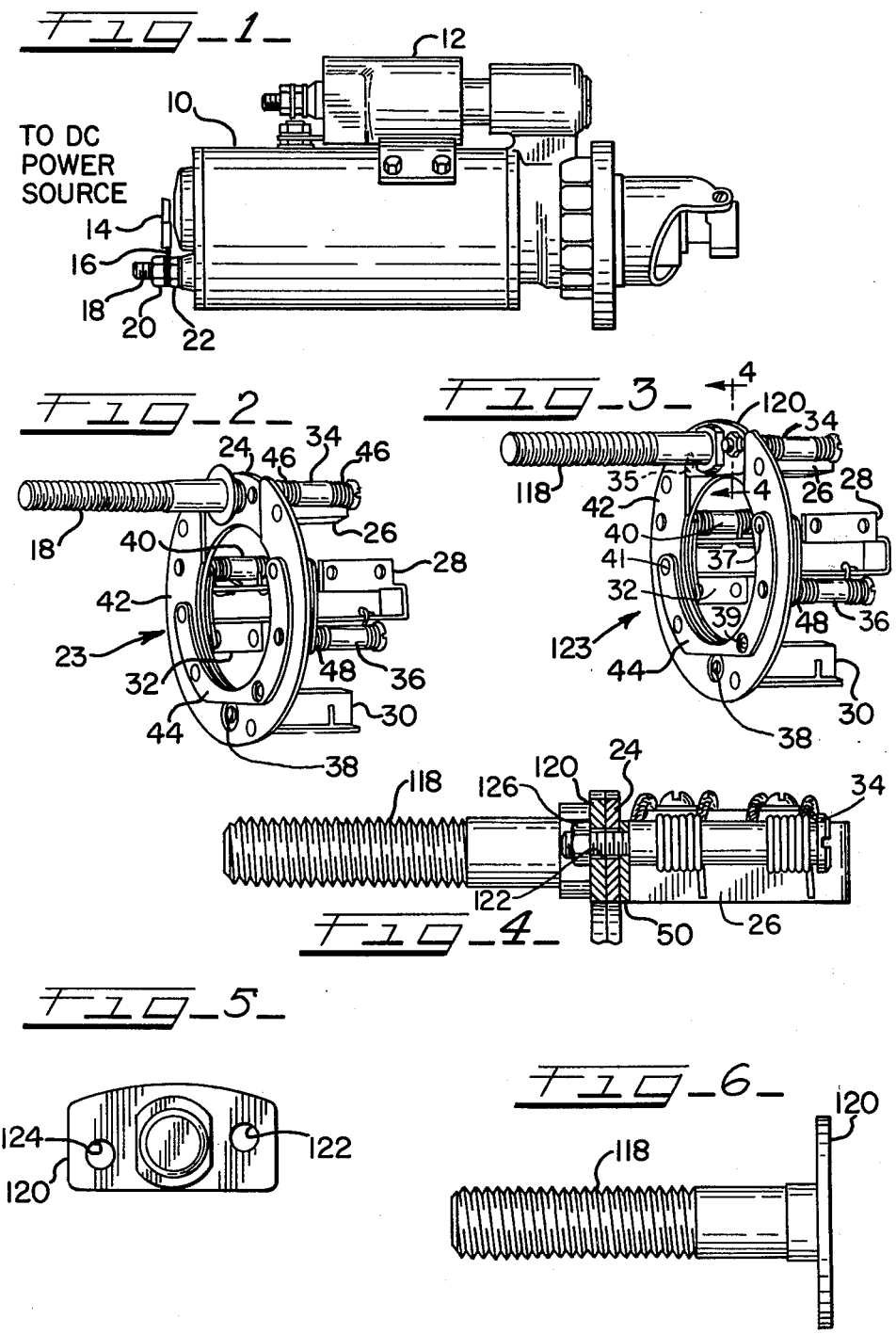

BRUSH PLATE ASSEMBLY

BACKGROUND AND SUMMARY OF THE INVENTION

This invention relates to improved direct current operated starting motors. More particularly, the invention relates to an improved brush plate assembly useful as a component in direct current operated starting motors.

Starting motors, e.g., associated with transportation vehicles, often operate off a direct current power source, e.g., battery. Such motors have a brush armature combination to provide the necessary rotation. Often, these motors have a brush plate assembly which contains a brush plate and a plurality of brush holders secured to the plate. In turn, the plate may be provided with an insulating plate and a support.

Direct current power is supplied to the brush plate by an elongated stud which is in electrical communication with a direct current power source. Conventionally, the brush plate and elongated stud are manufactured as a single unit.

During maintenance of the starting motors described above, the elongated stud of the brush plate assembly is particularly vulnerable to damage and may be broken from the remainder of the assembly. In the past, when such damage did occur, the entire brush plate assembly had to be discarded or, at best, disassembled in order to replace the elongated stud brush plate part. This, in turn, resulted in increased maintenance time and parts costs to the consumer. Clearly, it would be advantageous to reduce the time and material needed to repair a starter motor in the event of damage to the elongated stud.

Therefore, one object of the present invention is to provide an improved brush plate assembly.

An additional object of the invention is to provide a brush plate assembly for use in direct current operated starting motors which has improved maintenance characteristics. Other objects and advantages of the present invention will become apparent hereinafter.

An improved brush plate assembly has now been discovered. The assembly, for use in a direct current operated starter motor comprises a brush plate having a plurality of brush holders secured to it, and an elongated stud member removably secured to the brush plate and acting to provide electrical communication between a direct current source and the brush plate. An important characteristic of the present invention is that the elongated stud member be removably secured to the brush plate. That is, the present stud member and brush plate are separate components which are secured to each other and can be separated. In the event that the stud member is broken, or otherwise damaged, the stud can be removed from the brush plate and replaced by a different elongated stud without disturbing or disassembling the other components, e.g., brush holders and associated parts of the brush plate assembly. This reduced or simplified maintenance procedure for the brush plate assembly results in savings of time, labor and materials expense. For example, damage to the present elongated stud member may not result in the time consuming and wasteful replacement of the entire brush plate assembly.

One additional feature of the present invention involves fitting used brush plate assemblies with removable elongated stud members. For example, as noted previously, conventional brush plate assemblies are marketed so that the elongated stud and brush plate together form one part. When the elongated stud is broken off along its length or otherwise damaged, the entire brush plate assembly has been discarded. The present invention envisions efficiently restoring such damaged brush plate assemblies to full usefulness. Thus, the damaged elongated stud, cut, or otherwise separated, from the brush plate at or near the plane of the plate leaves an uneven surface at or near the plane of the brush plate which may be ground, polished and the like to provide improved electrical conductivity at such surface. After the damaged elongated stud has been separated from the brush plate, an elongated stud member according to the present invention is removably secured to the brush plate at or near such surface. Thus, the conventional brush plate assembly with a single part elongated stud brush plate can be restored or reworked into an assembly with a removable elongated stud member. Such restoration and/or reworking is within the scope of the present invention.

The brush plate assembly of the present invention preferably further includes at least two threaded screws for each brush holder. These threaded screws act to secure the brush holders to the brush plate.

In one preferred embodiment, the brush plate has two holes therethrough and the elongated stud member includes a base which also has two holes through it. The base of the elongated stud member is in contact with the brush plate so that the holes of the base are substantially aligned with the holes through the brush plate. These substantially aligned pairs of holes each receive one of the threaded screws, noted previously. Also included, in association with the base, is a nut means which abuts each of the base holes and acts to hold the threaded screws securely in the pair of substantially aligned holes. As noted above, this is a preferred embodiment by which the elongated stud member is removably secured to the brush plate.

These and other aspects and advantages of the present invention are set forth in the following detailed description, particularly when considered in conjunction with the accompanying drawing in which like parts bear like reference numerals.

BRIEF DESCRIPTION OF THE DRAWINGS

FIG. 1 is a frontal plan view of a direct current operated starting motor.

FIG. 2 is a perspective view of a prior art brush plate assembly.

FIG. 3 is a perspective view of a brush plate assembly according to the present invention.

FIG. 4 is a cross sectional view taken along line 4—4 of FIG. 3.

FIG. 5 is an end view of one embodiment of the present elongated stud member.

FIG. 6 is a top plan view of one embodiment of the present elongated stud member.

DESCRIPTION OF THE PREFERRED EMBODIMENT

Referring now to the drawings, starting motor 10 is equipped with solenoid switch 12 which acts to control the supply of direct current power to the motor 10. The starting motor 10 can be associated with the internal combustion engine of a transportation vehicle and functions to start such engine.

In response to the action of solenoid switch 12, D.C. power from a D.C. power source, e.g., storage battery, is transmitted via battery cable 14 through connector 16 to stud 18. Connector 16 is held firmly in place by bushings 20 and 22.

FIG. 2, which shows brush plate assembly 23, can be used to explain how D.C. power from stud 18 is used to provide the rotation necessary for starting motor 10 to perform its function. Stud 18 acts to transmit D.C. power to brush plate 24 which has four (4) brush holders 26, 28, 30 and 32 firmly secured to it by threaded posts 34, 36, 38 and 40, respectively. In addition four screws, one for each brush holder act in association with threaded posts 34, 36, 38 and 40 to insure that brush holders 26, 28, 30 and 32, respectively, are secured to brush plate 24. As is apparent from the drawings, threaded posts 34, 36, 38 and 40 and screws 35, 37, 39 and 41 extend into holes formed in brush holders 26, 28, 30 and 32, respectively, and brush plate 24 to secure brush holders 26, 28, 30 and 32 to brush plate 24.

In use, each of the brush holders 26, 28, 30 and 32 holds a brush (not shown) which comes into contact with the commutator (not shown) of the starting engine 10. Two of the brush holders, 26 and 30, are grounded whereas brush holders 28 and 32 are provided with D.C. power from brush plate 24. The interaction of the brushes in the grounded brush holders 26 and 30 and the brushes in brush holders 28 and 32 cause the commutator to rotate this allowing starting motor 10 to perform its function.

Certain additional components shown in FIG. 2 are as follows: An insulator 42 is attached to brush plate 24 so that the D.C. power can be properly directed. A support plate 44 acts to provide strength to the combination of brush plate 24 and insulator 42. Each of the brush holders 26, 28, 30 and 32 is equipped with two brush springs 46 which act to urge the brushes into contact with the commutator of starting motor 10. Each of the brush holders 28 and 32 are equipped with insulator plates 48 to insure that D.C. power passes to holders 28 and 32, while each of brush holders 26 and 30 are equipped with ground plates 50 to insure that holders 26 and 30 are grounded.

FIG. 3 illustrates brush plate assembly 123, which is an embodiment of the present invention. Except as noted below, the brush plate assembly 123 shown in FIG. 3 includes the same components and functions in a similar manner as the assembly 23 shown in FIG. 2. Brush plate assembly 123 includes stud 118 in place of stud 18 of assembly 23. Stud 118 is removably secured to brush plate 24 in brush plate assembly 123 whereas stud 18 is an integral part of brush plate 24 in assembly 23. Stud 118 functions in assembly 123 in a manner similar to stud 18 in assembly 23.

Stud 118 includes base portion 120 which is designed to contact brush plate 24. Base portion 120 includes two holes 122 and 124 which are positioned so as to be substantially aligned with the holes in brush plate 24 which accommodate threaded post 34 and its associated screw, respectively. Threaded post 34 and its associated screw are made to pass through the holes in brush plate 24 and holes 122 and 124, respectively, in base portion 120. It may be desirable to use threaded post 34 and its associated screw which are slightly elongated, in assembly 123 relative to the post 34 and its screw used in assembly 23, so that the threaded post 34 and its screw can easily pass through holes 122 and 124 of base portion 120. Stud 118 is removably secured in place, with base portion 120 in contact with brush plate 24 by applying nut 126 to the end of threaded post 34 extending through hole 122 of base portion 120. Bushing 126 is positioned in abutting relation to base portion 120 and acts to hold threaded post 34 in hole 122 of base portion 120 thereby co-operating to removeably secure stud 118 to brush plate 24. Similarly, although not shown, a second bushing is applied to the end of the screw extending through hole 124 to further secure stud 118 to brush plate 24.

Assembly 123 can be manufactured originally as shown in FIG. 3. Alternately, assembly 23 can be modified to be similar to assembly 123. For example, if stud 18 is broken and/or otherwise damaged, any remaining portion of stud 18 can be removed e.g., by cutting, at or near the surface of brush plate 24. Once stud 18 has been removed, stud 118 can be removably secured to brush plate 24, e.g., in a manner as detailed above.

In any event, the brush plate assembly of the present invention provides substantial materials, labor and time savings. Since stud 118 is removably secured to brush plate 24, damage to stud 118 requires a relatively simple replacement of only this component rather than replacing the entire assembly or, at best, disassembling the system to replace the brush plate stud component as is necessary in certain prior art assemblies. Clearly, the present brush plate assembly provides significant economies in both operation and maintenance.

Having thus described my invention, what I claim and desire to secure by Letters Patent is:

1. An improved brush plate assembly for use in a direct current operated starter motor comprising; a brush plate having a plurality of brush holders secured to said brush plate; an elongated stud member removeably secured to said brush plate and acting to provide electrical communication between a direct current source and said brush plate; and at least one threaded screw acting to secure one of said brush holders to said brush plate and to removeably secure said stud member to said brush plate by extending into holes formed in said one of said brush holders, said brush plate and said stud member.

2. The assembly of claim 1 which further comprises at least one threaded screw for each of said brush holders, said threaded screws acting to secure said brush holders to said brush plate by extending into holes formed in both one of said brush holders and said brush plate.

3. The assembly of claim 2 wherein said brush plate has at least one hole therethrough one of said brush holders having at least one hole therethrough, and said elongated stud member includes a base having at least one hole therethrough, said base being in contact with said brush plate and said one of said brush holders being in contact with said brush plate so that said brush plate hole, said brush holder hole, and said base hole are substantially aligned and said holes receive one of said threaded screws, said base further being provided with at least one bushing means abutting said base hole and acting to hold said screw securely in said holes, whereby said elongated stud member is removeably secured to said brush plate, and said one of said brush holders is secured to said brush plate.

* * * * *